US007299453B2

(12) United States Patent
Sluiman et al.

(10) Patent No.: US 7,299,453 B2
(45) Date of Patent: Nov. 20, 2007

(54) TESTING MEASUREMENTS (75) Inventors: Harm Sluiman, Scarborough (CA); Marcelo Paternostro, Markham (CA)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 10/294,945

(22) Filed: Nov. 14, 2002

(65) Prior Publication Data
US 2003/0135843 A1 Jul. 17, 2003

(30) Foreign Application Priority Data
Dec. 20, 2001 (CA) .................................. 2365732

(51) Int. Cl.
*G06F 9/44* (2006.01)
(52) U.S. Cl. ..................................... 717/124
(58) Field of Classification Search ................ 717/115, 717/124–129, 135; 714/46–48, 38, 2, 4; 702/186; 703/22; 707/200; 709/224
See application file for complete search history.

(56) References Cited

U.S. PATENT DOCUMENTS

| 4,689,338 A | 8/1987 | Gerster |
| 4,698,348 A | 10/1987 | Gerster |
| 4,929,624 A | 5/1990 | Gerster et al. |
| 4,988,815 A | 1/1991 | Andre et al. |
| 5,037,986 A | 8/1991 | Gerster |
| 5,175,296 A | 12/1992 | Gerster |
| 5,238,944 A | 8/1993 | Wick et al. |
| 5,266,575 A | 11/1993 | Gerster |

(Continued)

FOREIGN PATENT DOCUMENTS

EP    0 394 026    10/1990

(Continued)

OTHER PUBLICATIONS

Testerman, et al., "Cytokine Induction by the Immunomodulators Imiquimod and S-27609", *Journal of Leukocyte Biology*, vol. 58, pp. 365-372, Sep. 1995.

(Continued)

*Primary Examiner*—Wei Zhen
*Assistant Examiner*—Anna Deng
(74) *Attorney, Agent, or Firm*—Duke W. Yee; Jeffrey S. LaBaw; Wayne P. Bailey (57) ABSTRACT

Embodiments of the invention include a testing measurement which output a non-binary test result for one or more steps or processes performed during execution of a test of a subject. The non-binary test result, which may be output by a verification point or a test script, provides a developer with an improved gauge of the subject under test. In embodiments of the present invention, a test script or verification point will, rather than simply generate a "pass" or "fail" (i.e., "successful" or "unsuccessful") output, generate a non-boolean value providing data with improved correlation between the test output and the relative success of a test script. In some embodiments, each verification point or test script can be associated with a rule for determining the test output which can be easily modified. This aspect provides users with an ability to carefully develop and implement a test result rule which provides output which enhances test output data analysis.

6 Claims, 6 Drawing Sheets

U.S. PATENT DOCUMENTS

| | | | |
|---|---|---|---|
| 5,268,376 A | 12/1993 | Gester | |
| 5,346,905 A | 9/1994 | Gerster | |
| 5,352,784 A | 10/1994 | Nikolaides et al. | |
| 5,367,076 A | 11/1994 | Gerster | |
| 5,376,501 A | 12/1994 | Mariën et al. | |
| 5,389,640 A | 2/1995 | Gerster et al. | |
| 5,395,937 A | 3/1995 | Nikolaides et al. | |
| 5,482,936 A | 1/1996 | Lindstrom | |
| 5,494,916 A | 2/1996 | Lindstrom et al. | |
| 5,659,547 A * | 8/1997 | Scarr et al. | 714/4 |
| 5,693,811 A | 12/1997 | Lindstrom | |
| 5,741,908 A | 4/1998 | Gerster et al. | |
| 5,756,747 A | 5/1998 | Gerster et al. | |
| 5,939,090 A | 8/1999 | Beaurline et al. | |
| 5,991,537 A * | 11/1999 | McKeon et al. | 717/115 |
| 6,002,871 A * | 12/1999 | Duggan et al. | 717/135 |
| 6,028,076 A | 2/2000 | Hirota et al. | |
| 6,039,969 A | 3/2000 | Tomai et al. | |
| 6,052,694 A * | 4/2000 | Bromberg | 707/200 |
| 6,069,149 A | 5/2000 | Nanba et al. | |
| 6,083,505 A | 7/2000 | Miller et al. | |
| 6,110,929 A | 8/2000 | Gerster et al. | |
| 6,148,277 A * | 11/2000 | Asava et al. | 703/22 |
| 6,194,338 B1 | 2/2001 | Andolfatto et al. | |
| 6,194,425 B1 | 2/2001 | Gerster et al. | |
| 6,200,592 B1 | 3/2001 | Tomai et al. | |
| 6,207,646 B1 | 3/2001 | Krieg et al. | |
| 6,239,116 B1 | 5/2001 | Krieg et al. | |
| 6,245,776 B1 | 6/2001 | Skwierczynski et al. | |
| 6,329,381 B1 | 12/2001 | Kurimoto et al. | |
| 6,331,539 B1 | 12/2001 | Crooks et al. | |
| 6,339,068 B1 | 1/2002 | Krieg et al. | |
| 6,376,669 B1 | 4/2002 | Rice et al. | |
| 6,406,705 B1 | 6/2002 | Davis et al. | |
| 6,426,334 B1 | 7/2002 | Agrawal et al. | |
| 6,451,810 B1 | 9/2002 | Coleman et al. | |
| 6,476,000 B1 | 11/2002 | Agrawal | |
| 6,525,064 B1 | 2/2003 | Dellaria et al. | |
| 6,587,969 B1 * | 7/2003 | Weinberg et al. | 714/46 |
| 6,738,933 B2 * | 5/2004 | Fraenkel et al. | 714/47 |
| 2002/0055517 A1 | 5/2002 | Smith | |
| 2002/0058674 A1 | 5/2002 | Hedenstrom et al. | |

FOREIGN PATENT DOCUMENTS

| | | |
|---|---|---|
| EP | 1 104 764 | 6/2001 |
| JP | 9-208584 | 8/1997 |
| JP | 9-255926 | 3/1999 |
| JP | 11-222432 | 8/1999 |
| JP | 2000-247884 | 9/2000 |
| WO | WO 00/47719 | 8/2000 |
| WO | WO 00/75304 A1 | 12/2000 |
| WO | WO 00/76505 | 12/2000 |
| WO | WO 00/76518 | 12/2000 |
| WO | WO 01/74343 | 10/2001 |
| WO | WO 02/36592 | 5/2002 |
| WO | WO 02/46188 | 6/2002 |
| WO | WO 02/46189 | 6/2002 |
| WO | WO 02/46190 | 6/2002 |
| WO | WO 02/46191 | 6/2002 |
| WO | WO 02/46192 | 6/2002 |
| WO | WO 02/46193 | 6/2002 |
| WO | WO 02/46194 | 6/2002 |
| WO | WO 02/46749 | 6/2002 |
| WO | WO 02/102377 | 12/2002 |

OTHER PUBLICATIONS

Chollet, et al, "Development of a Topically Active Imiquimod Formulation", *Pharmaceutical Development and Technology*, 4(1), pp. 35-43 (1999).

Hornung et al., "Quantitative Expression of Toll-Like Receptor 1-10 mRNA in Cellular Subsets of Human Peripheral Blood Mononuclear Cells and Sensitivity to CpG Oligodeoxynucleotides[1]", *The Journal of Immunology*, 2002, 168: 4531-4537.

Hiroaki et al., "Small anti-viral compounds activate immune cells via the TLR7 MyD88-dependent signalling pathway", *Nature Immunology*, Feb. 2002, vol. 3, No. 2: 196-200.

Medzhitov, "Toll-Like Receptors and Innate Immunity", *Nature Reviews Immunology*, Nov. 2001, vol. 1: 135-145.

Jurk et al. "Human TLR7 and TLR8 independently confer responsiveness to the antiviral compound R-848", *Nature Immunology*, Jun. 2002, vol. 3, No. 6: 1.

Akira et al., "Toll-like receptors: critical proteins linking innate and acquired immunity", *Nature Immunology*, Aug. 2001, vol. 2, No. 8: 675-680.

* cited by examiner

```
/* The DoorVP verification point is responsible for reporting the amount of light of a particular
*door during the testcase execution. This is done by setting the verification point value with the
*appropriate value of the array. The purpose of this verification point is to improve the log and/or
* to allow the test tool to change the execution flow based on the information obtained.
*/
if(instruction instanceof DoorVP)
{
    DoorVP vp = (DoorVP)instruction;

int door = vp.getDoorNumber();
    vp.setResult(footCandleByDoor[door]);

/* The RoomVP verification point is responsible for reporting the total amount of light on the
 * dark room. This is done by adding all the values stored on the array.
 */
if(instruction instanceof RoomVP)  ← 406b
{
　　RoomVP vp = (RoomVP)instruction;

int totalFootCandle = 0;  ← 602
　　for(int i=0; i<testcase.getDoorCount(); i++)  ⎫
　　　　totalFootCandle += footCandleByDoor[i];   ⎬ ← 604
                                                  ⎭ roomVP.setResult(totalFootCandle);  ← 606
　　continue;
}

TESTING MEASUREMENTS

CROSS REFERENCE TO RELATED APPLICATIONS

The present application is related to copending commonly assigned U.S. patent application Ser. No. 10/294,994, entitled: Organization of Test Cases and U.S. patent application Ser. No. 10/294,248, entitled: Testing Measurements, which are hereby incorporated by reference.

FIELD OF THE INVENTION

The present invention general relates to the testing of computer applications and, more particularly to testing measurements.

BACKGROUND OF THE INVENTION

Most computer applications (hereinafter "applications") are very complex systems that, due to their complexity, require significant testing to ensure that the application will execute as desired.

To facilitate the testing of applications, test cases or test suites (essentially a collection of test cases) are designed, implemented and used to test a portion or the whole of an application (often referred to as the subject under test). In many applications, these test cases manipulate the external facade or interface of the subject under test. The results of these test cases are then analyzed and evaluated. As many applications are quite complex, several, sometimes hundreds, of test cases are used for the testing of a single application.

For example, a database application may need to be tested to determine whether data can be added to the database (this is the test case). A test script would need to be created to implement the test case. The exemplary test script could include several steps, instructions or processes to test this aspect of the application including: gaining access to update the database, transmitting the update request; receiving confirmation that the update request has been executed; reading from the database to determine if the data in the update request was stored successfully; and then logging off from the database.

Presently, testing enables a tester to insert a verification point at all, some or none of the steps that are performed in the test script that implements a test case. A verification point, when inserted into the test script, will issue or output a binary value (usually a single bit of data—e.g., a boolean value) that indicates whether a step(s) with which the verification point is associated was successfully or unsuccessfully completed. The output of the test script execution, which includes the values output by the verification points, is typically stored in a test case execution script log.

The verification points enable testers to analyze the test case execution log to ascertain which processes in the test case failed and, thus, which portions of the subject under test need to be investigated to rectify any problems (i.e., solve any bugs in the application, if necessary).

Some testing tools presently on the market will terminate the execution of a test script as soon as a single verification point is reached which indicates that an associated step was not performed successfully. Other testing tools will attempt, if possible, to continue processing the test script execution and outputting data from the verification points.

As a result of the data output by the verification points, a test script execution will generate an output which indicates whether the application successfully or unsuccessfully performed the test case (the test output). The test output of the test script execution (which is in addition to test logs that are typically generated) is, like the output of a verification point, a binary value. If even a single step in the test script failed then the entire test script execution will output a value also indicating failure of the execution of test script (i.e., the application failed in performing the test case). Only when all steps are successfully performed will the test script output indicate successful completion.

It will be appreciated that when a deadline for release of an important application draws near, the application developers (the development team) are under considerable stress to have the application ready for release with a minimum number of bugs or quality or stability related issues. At this time, review of the test output data generated by the test scripts executions is often at its highest. During this review, much effort and time is spent attempting to ascertain the reason certain test scripts execution have failed to complete successfully indicating a likely problem with the subject under test. It is common in the industry, especially as deadlines loom, to disregard the test results from some test scripts execution for a variety of reasons. For example, a test script may be considered by the development team as testing an "unimportant" or "inconsequential" aspect of the subject under test. Other test scripts may be disregarded on an ad hoc basis because of a developer's intuition or experience indicating that the unsuccessful result from the execution of a test script was not as a result of a failure of the subject under test but rather another application or component (e.g., the operating system, memory management, etc.). Unfortunately, this analysis is often inaccurate or misguided and potentially results in the release of an unacceptable application. Moreover, the rationale for ignoring some test results while relying on others is not documented which may prove unfortunate after a product has been released.

In a further shortcoming of known systems, significant time may be spent analyzing the unsuccessful results issued by a test script execution in an attempt to ascertain the cause(s) of the failure. This analysis is premised on the possibility that all failures should be determined and that most or sometimes all of the failures are the result of flaws or bugs in the subject under test. However, in some instances, the failure may be the result of a failure in another portion of the computer system(s) on which the subject under test is relying. In such an instance, a developer or tester may have misspent significant time and energy investigating a flaw which is not caused by the subject under test.

For example, returning to the database example described above, suppose that the test script process for logging off from the database required transmitting to the database a "logoff" command. Further assume that the database itself (and not the application/subject under test) had a slight bug that issued an error message despite properly logging off a user. In this scenario, the verification point associated with the portion of the test script for logging off would output indication of a failure and the test script, even if every other process completed successfully, would, as a result of the reported logoff failure, also generate test output indicating a failure of the subject under test. Moreover, unfortunately while this failing result may be technically accurate (i.e., the test script did not successfully complete each of the processes contained therein) it is misleading and inaccurate in substance (i.e., the subject under test actually successfully performed all of its processes and only another element relied upon by the subject under test failed). This situation could lead to significant time and energy being spent by a developer attempting to eradicate a bug in the subject under test which does not exist (the bug exists in the database).

Accordingly, a testing measurement which addresses, at least in part, some of the shortcomings described above is desired.

SUMMARY OF THE INVENTION

The present invention is directed to a testing measurement, and related methods, apparatus, systems and tools which address, at least in part, some the various described shortcomings.

Aspects of the invention include a testing measurement which output a non-binary test result for one or more steps or processes performed during execution of a test of a subject. The non-binary test result, which may be output by a verification point or a test script, provides a developer with an improved gauge of the subject under test. In embodiments of the present invention, a test script or verification point will, rather than simply generate a "pass" or "fail" (i.e., "successful" or "unsuccessful") output, generate a non-boolean value providing data with improved correlation between the test output and the relative success of a test script.

In some embodiments, each verification point or test script can be associated with a rule for determining the test output which can be easily modified. This aspect provides users with an ability to carefully develop and implement a test result rule which provides output which enhances test output data analysis.

A non-boolean test result can provide a tester with data that enables a more informed decision to be made as to the status of an application under development. Moreover, in many circumstances, focus on development of a rule for determining the test output for a verification point or test script can eliminate the need to ignore test results an ad hoc basis based on an undocumented rationale.

In accordance with an aspect of the present invention there is provided a verification point for use in a test script, said verification point adapted to output a non-binary value.

In accordance with another aspect of the present invention there is provided a test script for testing a computer application in whole or in part, said test script comprising a verification point, said verification point outputting a non-binary value.

In accordance with still another aspect of the present invention there is provided a script for testing a computer application, said test script adapted to output at least one non-binary value.

In accordance with still another aspect of the present invention there is provided a test tool for generating a test script for testing a computer application in whole or in part, said test tool adapted to generate a test script which outputs a non-binary value.

In accordance with still another aspect of the present invention there is provided a method for generating a test script said method comprising: creating a verification point for receiving data responsive to execution of an instruction, wherein said verification point is adapted to output a non-binary value representative of execution of said instruction.

In accordance with still another aspect of the present invention there is provided a computer readable media containing data and instructions, said data and instructions when executed by a computer system adapt said computer system to: generate a test script for testing a computer application in whole or in part, which outputs a non-boolean value.

In accordance with still another aspect of the present invention there is provided a computer readable media containing data and instructions, said data and instructions when executed by a computer system adapt said computer system to: create a verification point for receiving data responsive to execution of an instruction, wherein said verification point is adapted to output a non-binary value representative of execution of said instruction.

In accordance with still another aspect of the present invention there is provided a verification point for use in a test script, said verification point comprising a means for outputting a non-binary value.

In accordance with still another aspect of the present invention there is provided a test tool for generating a test script for testing a computer application in whole or in part, said test tool adapted to generate a test script comprising means for outputting a non-binary value.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an example embodiment of this invention.

DETAILED DESCRIPTION

Figure 1:
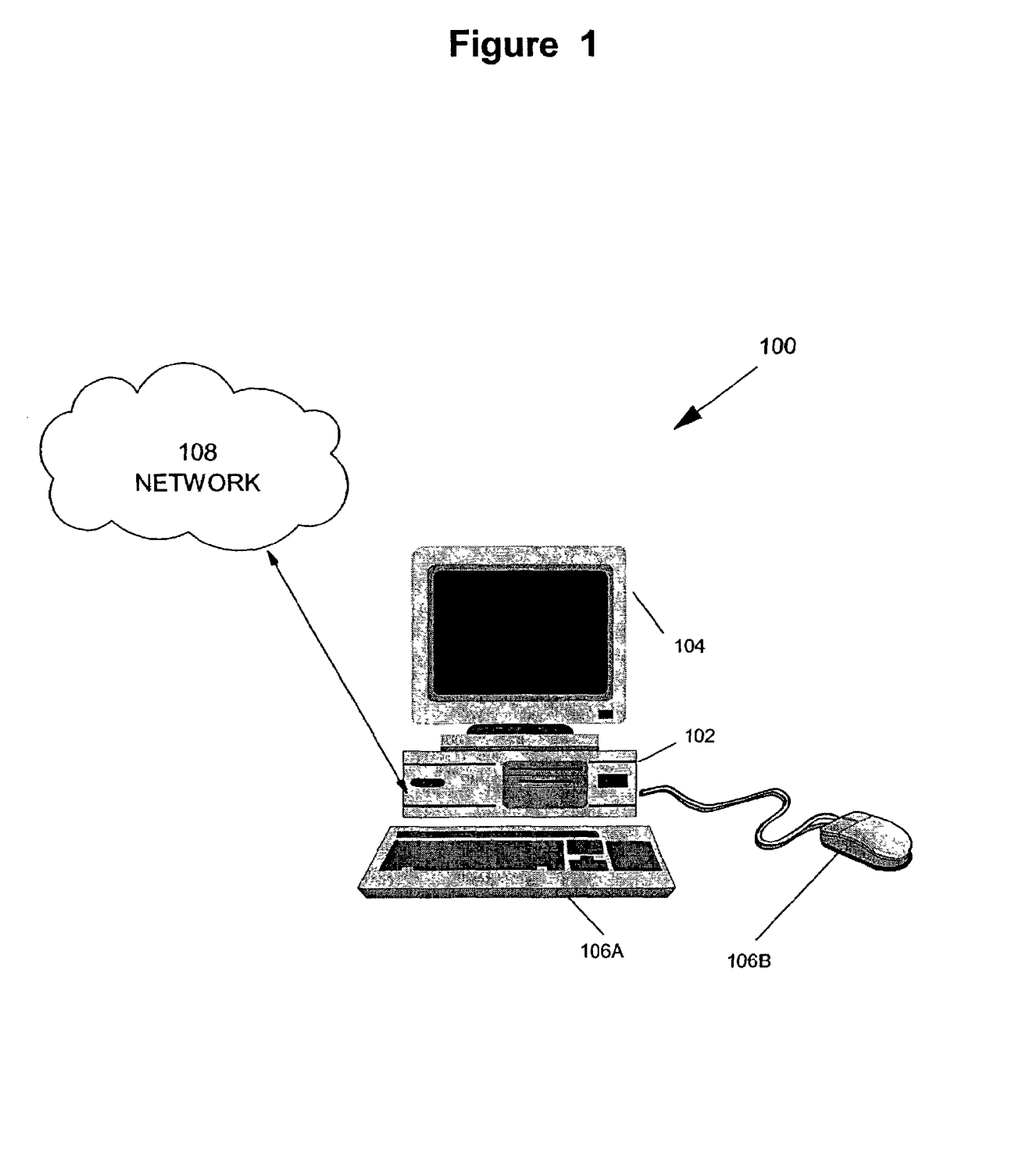
FIG. 1 schematically illustrates a computer system embodying aspects of the invention.

An embodiment of the invention, computer system 100, is illustrated in FIG. 1. Computer system 100, illustrated for exemplary purposes as a networked computing device, is in communication with other networked computing devices (not shown) via network 108. As will be appreciated by those of ordinary skill in the art, network 108 may be embodied using conventional networking technologies and may include one or more of the following: local area networks, wide area networks, intranets, public Internet and the like. Computer system 100 may interact with other networked computer systems (not shown) providing application testing and analysis of a distributed application.

Throughout the description herein, an embodiment of the invention is illustrated with aspects of the invention embodied solely on computer system 100. As will be appreciated by those of ordinary skill in the art, aspects of the invention may be distributed amongst one or more networked computing devices which interact with computer system 100 via one or more data networks such as, for example, network 108. However, for ease of understanding, aspects of the invention have been embodied in a single computing device—computer system 100.

Computer system 100 includes processing system 102 which communicates with various input devices 104, output devices 106 and network 108. Input devices 104, two of which are shown, may include, for example, a keyboard, a mouse, a scanner, an imaging system (e.g., a camera, etc.) or the like. Similarly, output devices 106 (only one of which is illustrated) may include displays, information display unit printers and the like. Additionally, combination input/output (I/O) devices may also be in communication with processing system 102. Examples of conventional I/O devices include removable and fixed recordable media (e.g., floppy disk drives, tape drives, CD-ROM drives, DVD-RW drives, etc.), touch screen displays and the like.

Figure 2:
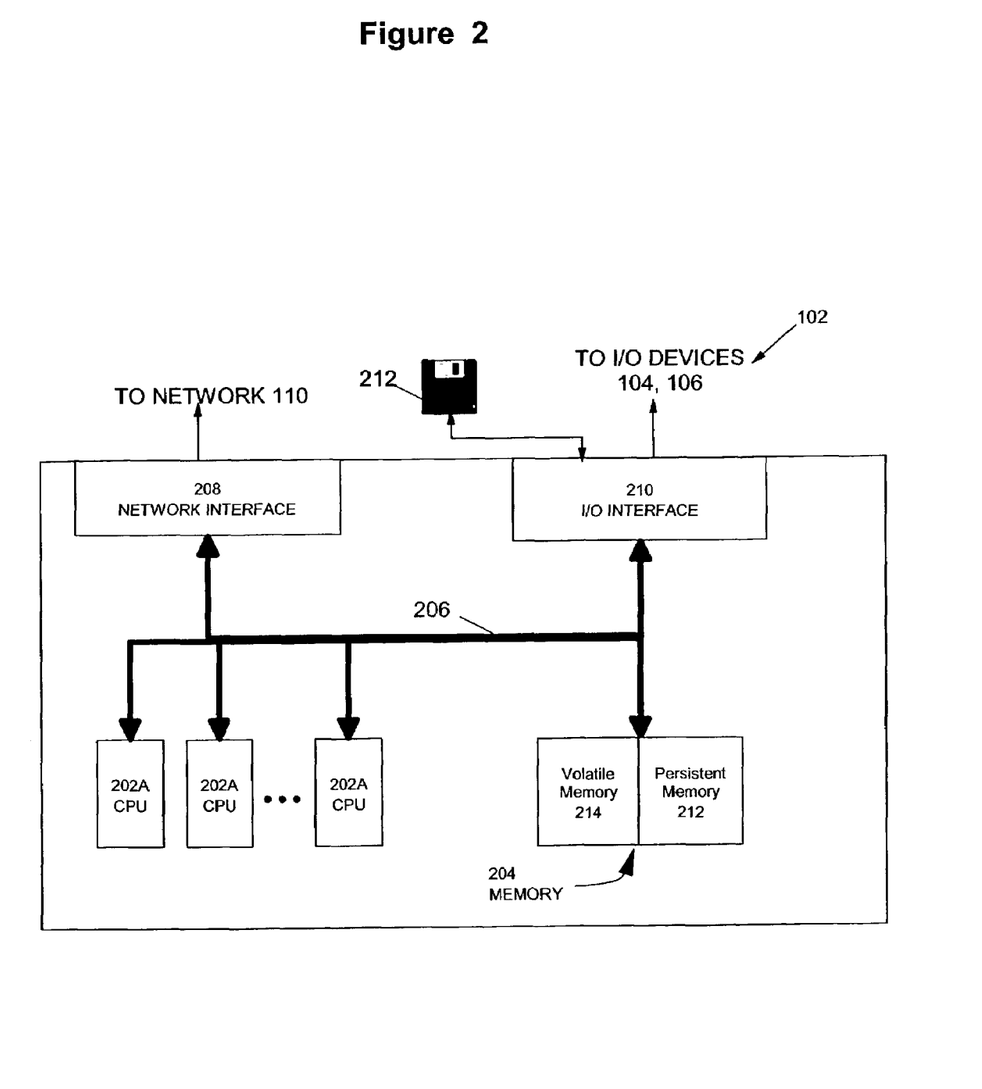
FIG. 2 schematically illustrates, in greater detail, a portion of the computer system of FIG. 1.

Exemplary processing system 102 is illustrated in greater detail in FIG. 2. As illustrated, processing system 102 includes several components—central processing unit (CPU) 202, memory 204, network interface (I/F) 208 and I/O I/F 210. Each component is in communication with the other components via a suitable communications bus 206 as required.

CPU 202 is a processing unit, such as an Intel Pentium™, IBM PowerPC™, Sun Microsystems UltraSparc™ processor or the like, suitable for the operations described herein. As will be appreciated by those of ordinary skill in the art, other embodiments of processing system 102 could use alternative CPUs and may include embodiments in which one or more CPUs are employed. CPU 202 may include various support circuits to enable communication between itself and the other components of processing system 102.

Memory 204 includes both volatile and persistent memory for the storage of: operational instructions for execution by CPU 202, data registers, application storage and the like. Memory 204 preferably includes a combination of random access memory (RAM), read only memory (ROM) and persistent memory such as that provided by a hard disk drive.

Network I/F 208 enables communication between computer system 100 and other network computing devices (not shown) via network 108. Network I/F 208 may be embodied in one or more conventional communication devices. Examples of a conventional communication device include an Ethernet card, a token ring card, a modem or the like. Network I/F 208 may also enable the retrieval or transmission of instructions for execution by CPU 202 from or to a remote storage media or device via network 108.

I/O I/F 210 enables communication between processing system 102 and the various I/O devices 104, 106. I/O I/F 210 may include, for example, a video card for interfacing with an external display such as output device 106. Additionally, I/O I/F 210 may enable communication between processing system 102 and a removable media 212. Although removable media 212 is illustrated as a conventional diskette other removable memory devices such as Zip™ drives, flash cards, CD-ROMs, static memory devices and the like may also be employed. Removable media 212 may be used to provide instructions for execution by CPU 202 or as a removable data storage device.

Figure 3:
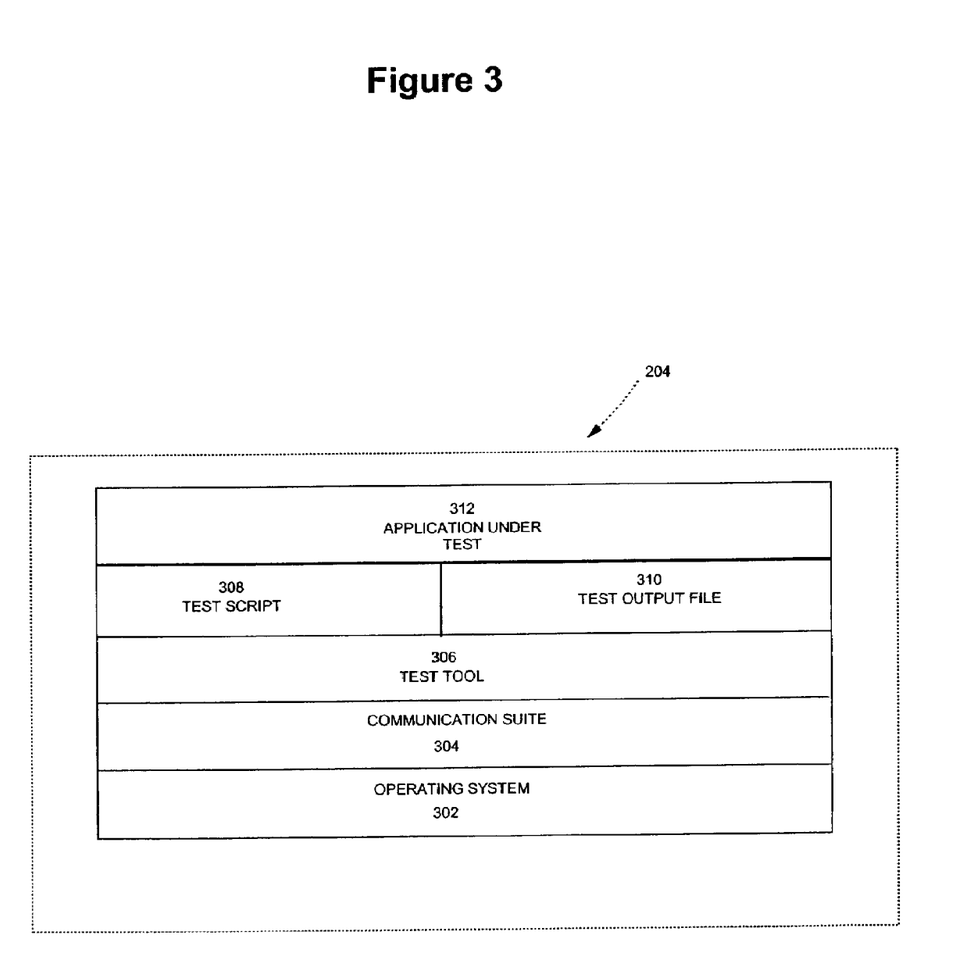
FIG. 3 illustrates, in functional block form, a portion of FIG. 2.

The computer instructions/applications stored in memory 204 and executed by CPU 202 (thus adapting the operation of computer system 100 as described herein) are illustrated in functional block form in FIG. 3. As will be appreciated by those of ordinary skill in the art, the delineation between aspects of the applications illustrated as functional blocks in FIG. 3 is somewhat arbitrary as the various operations attributed to a particular application as described herein may, in alternative embodiments, be subsumed by another application.

As illustrated, for exemplary purposes only, memory 202 stores operating system (OS) 302, communications suite 304, test tool 306, test script 308, test output file 310 and the application under test 312 (hereinafter "application 312").

OS 302 is an operating system suitable for operation with a selected CPU 202 and the operations described herein. Multitasking, multithreaded OSes such as, for example, IBM AIX™, Microsoft Windows NT™, Linux or the like, are expected in many embodiments to be preferred.

Communication suite 304 provides, through, interaction with OS 302 and network I/F 208 (FIG. 2), suitable communication protocols to enable communication with other networked computing devices via network 108 (FIG. 1). Communication suite 304 may include one or more of such protocols such as TCP/IP, ethernet, token ring and the like.

Test tool 306 is used by testers and developers to generate test scripts 308 which, when executed, test aspects of application 312 and generate test output file 310. Test tool 306 may be adapted from conventional or known test tools to perform the functions described herein. Test tool 306 may be used to: partially automate the entire testing process from generating test script 308; test application 312 using test script 308; and present the data in test output file 310 output by test script 308.

Figure 4:
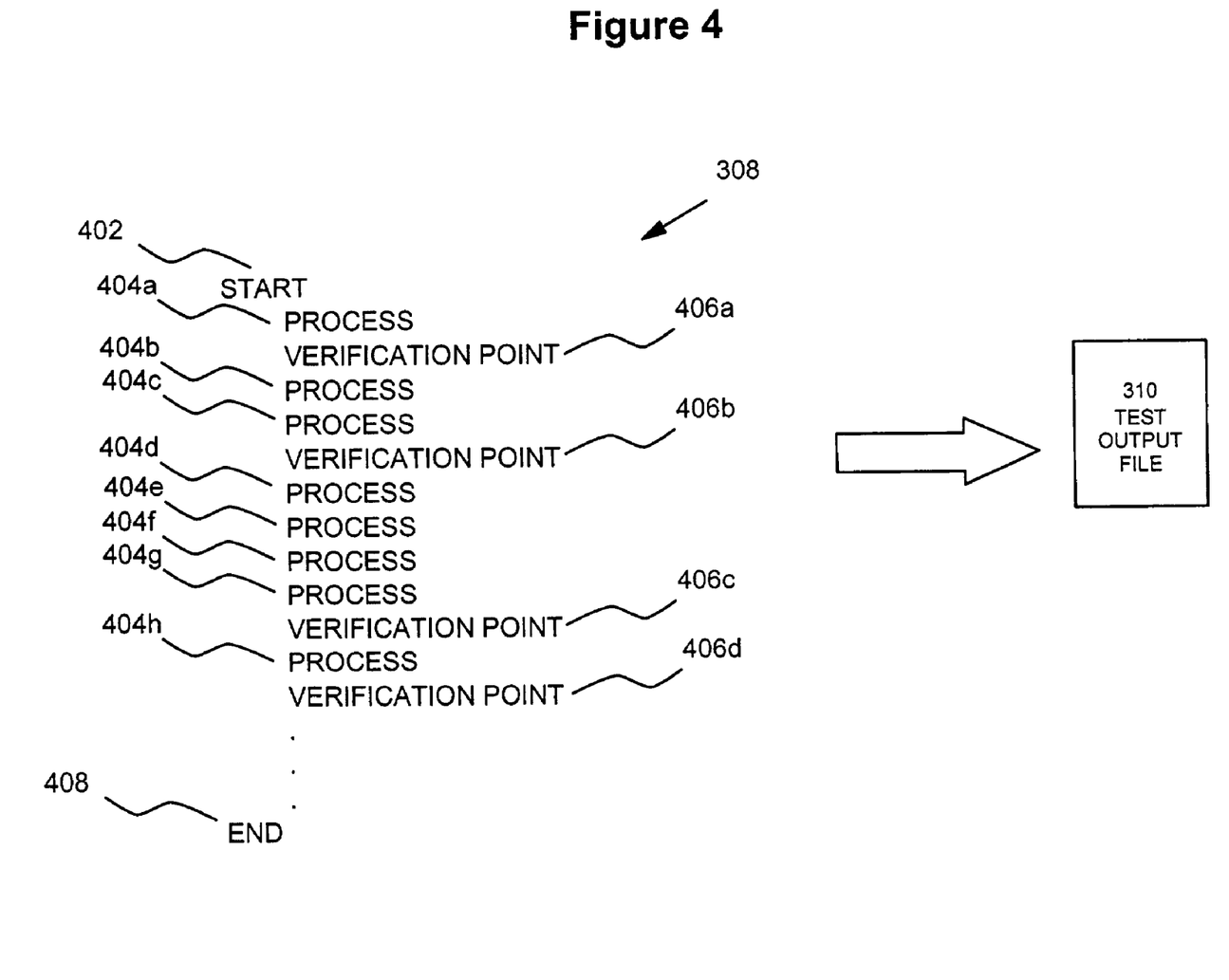
FIG. 4 is an exemplary embodiment of a test script of FIG. 3 embodying aspects of the invention.

An exemplary test script 308, illustrated in logical organization, illustrates the various components contained therein and the relationships therebetween. Generally, a test script 308 includes a start 402, one or more instructions or processes 404, one or more verification points 406 and an end 408. Executing the test script 308 which will exercise a function of application 312 (FIG. 3) and will result in output file 310.

Start 402 provides opportunity for the initialization and/or configuration of: test script 308; the environment in which application 312 will tested; and application 312.

Processes 404 (processes 404a-404h are illustrated) are the various steps or processes that are performed to test application 312. This may include, for example, transmitting data used as input to a user interface of application 312, issuing commands to application 312 and the like.

Embedded within test script 308 are one or more verification points 406 each which is used to assess the performance of one or more processes 404. Several verification points 406 (verification points 406a-406d) are illustrated for exemplary purposes.

A single verification point 406 may be associated with one or more processes. Additionally, a single verification may generate an output based on one or more inputs. An input into a single verification point 406 may be a binary or non-binary value which the verification point 406 uses to generate an output indicative of the relative success of the process(es) with which the verification point is associated.

Figure 5:
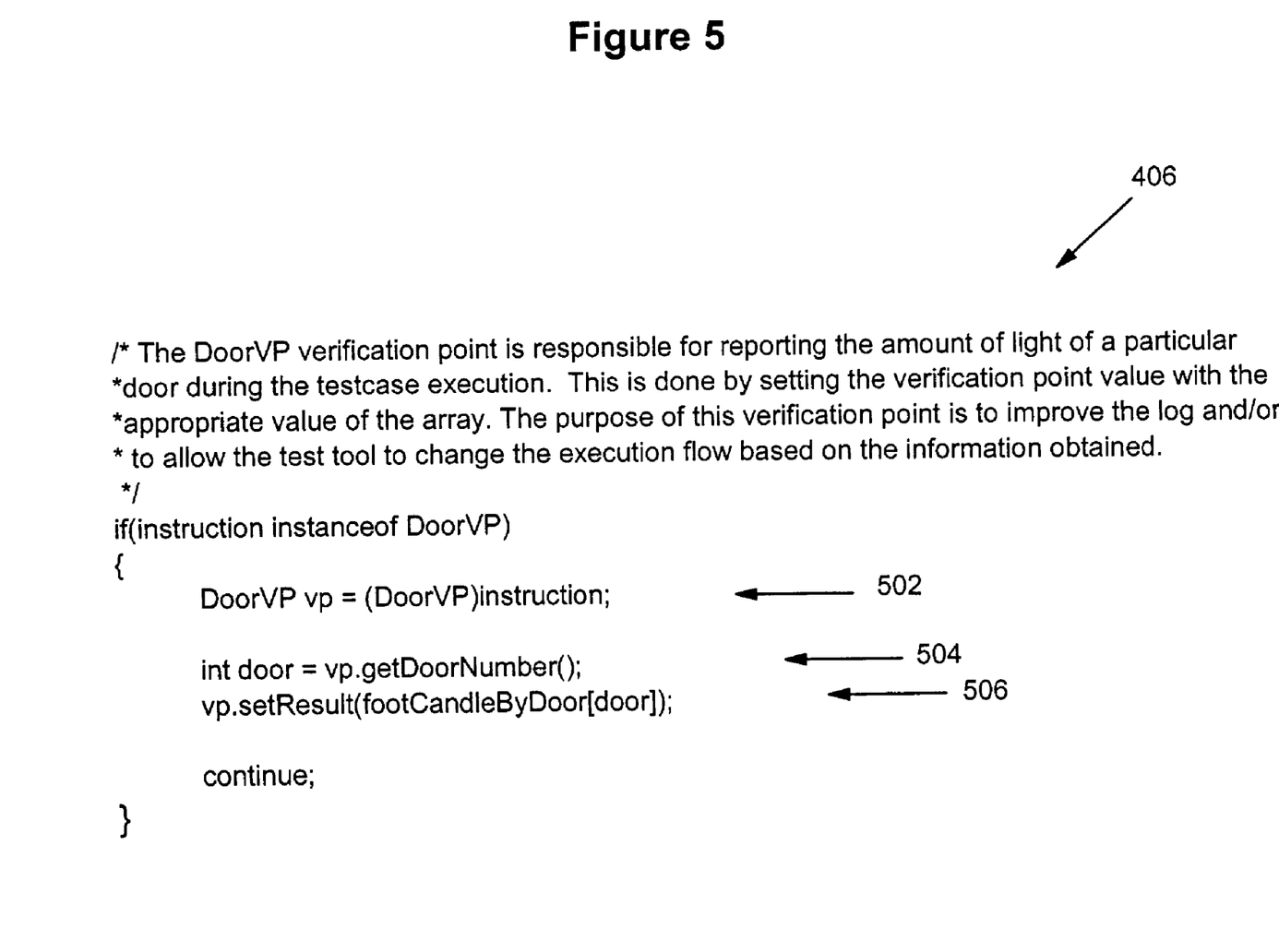
FIG. 5 is a first exemplary verification point embodying aspects of the invention which may form part of the test script of FIG. 3.
Figure 6:
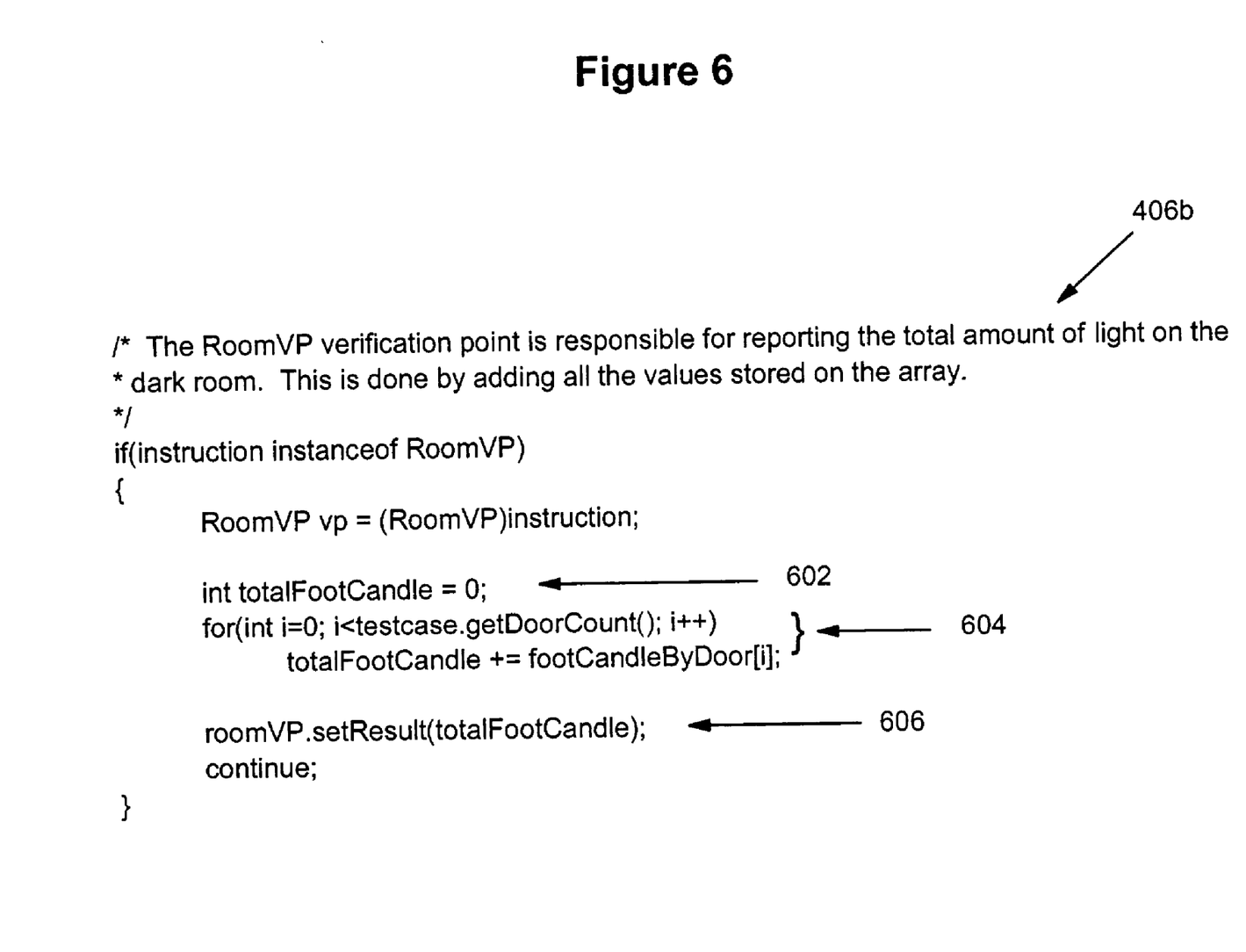
FIG. 6 is a second exemplary verification point embodying aspects of the invention which may form part of the test script of FIG. 3.

Two exemplary verification points 406a and 406b are illustrated in FIGS. 5 and 6, respectively. The exemplary verification points are both related to the test script 308 implementing a test case designed to test an application 312 which could be used for certifying that a photographic darkroom satisfies certain requirements based on light intrusion. That is, the exemplary photography related application 312 is designed to simply certify a darkroom (based on light sensor inputs) or deny certification.

A test script 308 may be implemented to assess whether the data inputs from each light sensor (one per door into the darkroom) to application 312 used to determine whether certification is to be granted are operating properly. Such a test script 308 could include exemplary verification points 406a and 406b (FIGS. 5 and 6).

As will be appreciated, no room used for photography is ever completely without light (i.e., there is always some degree of light intrusion). In conventional test scripts, the output testing the same function (proper operation of light sensor inputs) as verification point 406a would simply indicate "PASS" (i.e., receiving data indicating a small amount of light is reaching each light sensor and therefore each sensor was working properly) or "FAIL" (i.e., one or more light sensor inputs not working properly by failing to provide a non-zero positive reading). However, these simple test results may be unsatisfactory since one or more light sensor may be indicating that it is receiving an unexpected and incorrect amount of light. Use of exemplary verification point 406a could be used to provide additional data.

As illustrated in FIG. 5, verification point 406a is designed to test and report to test script 308 the amount of light received by a particular light sensor associated with a door for entering/exiting the darkroom which is being certified by application 312. Conventional verification points would simply test to determine whether data was being received by application 312 from a light sensor. If data was being received, a conventional verification point would generate output indicating that that portion of the test script 308 was successful. If data was not being received by application 312, a conventional verification point would generate output indicating that that portion of test script 308 was not successful. In contrast, verification point 406a, which outputs an integer value (in contrast to the binary values provided by conventional verification points) provides additional data for analysis by the user, the test script or a test suite. Moreover, the verification rule used to generate the output is explicitly defined by verification point 406a in instructions 502, 504 and 506. This rule explicitly defines how output from verification point 406a is generated, the inputs used to generate this output and the type of output which is generated by verification point 406a. If, for whatever reason it is necessary to modify the verification rule, the rule is easily identified and modified. For example, the inputs received from application 312 and used by verification point 406a of test script 308 may change as application 312 is developed. Accordingly, the verification rule of verification point 406a may require modification to handle such a change. Alternatively, the test case (which is implemented by test script 308) may change impacting the type, kind or substance of output required from verification point 406a. Modification of the verification rule can quickly be made to react to this scenario.

As illustrated, verification point 406a, which is part of a test script 308 written in the computer language JAVA, includes an instance of the class "DoorVP" (502) and then, for a particular door (identified by the get DoorNumber method—504), sets the output of verification point 406a to the required output which in the exemplary embodiment is a data representative of the amount of light (in foot candles) received by application 312.

In FIG. 6 a second exemplary verification point 406b is illustrated. Verification point 406b would, like a conventional verification point, be used to test the overall output of application 312 which determines whether a darkroom meets a particular standard and can, therefore, be certified. However, unlike conventional verification point which would only indicate whether certain processes or operations were performed successfully, verification point 406b provides enhanced performance information. Exemplary verification point 406b is designed to receive as input the data output by each of the light sensors which have been collected by application 312 and stored in an array. The output of verification point 406a (which is an instance of class "DoorVP"-502) is a sum of the data representative of the light measured by each of the light sensors (604). The output of verification point 406a is set by instruction 606 and is an integer (i.e., a non-binary value). The integer output of verification point 406a may be a digital output (i.e., comprising bits of data) but the output itself does not represent a binary (i.e., TRUE/FALSE, PASS/FAIL, ON/OFF, etc.) value but rather a value which provides more information.

Similar to verification point 406a, verification point 406b also includes a verification rule (instructions 602, 604 and 606) which define the verification point's properties (i.e., the output generated, the calculation or computation to calculate the output and the inputs used).

While the exemplary verification points 406a and 406b (FIGS. 5 and 6) both output scalar integers, other non-binary outputs could be equally be employed. For example, a success rate indicative of the ratio of successful versus unsuccessful processes could be generated and output by a verification point 406. Similarly, a verification point 406 could output data which indicates a value representative of relative success in a given range. For example, a verification point 406 could output "100" if all associated processes were performed successfully, "0" if all associated processes were performed unsuccessfully and a value between "0" and "100" to indicate a relative rate of success for instances where some processes were performed successfully and others were performed unsuccessfully. Raw values could be output by a verification point indicative of an operation performed by application 312. For example, data collected by application 312 from a light sensor could be the output of a verification point. Other data types could also be output by a verification point 406 (e.g., a string, a floating point number, a boolean, etc.)

In addition to different types of output possible from a verification point embodying aspects of the present invention, alternative embodiments could include multiple outputs from a single verification point. For example, if processes performed by application 312 could be tested in more than one way, a verification point could be implemented which outputs multiple test results each calculating test results or verifying the performance of processes in a different manner. For example, verification point 406a (FIG. 5) outputs an integer value indicative of the data received by application 312 from a light sensor. In an alternative embodiment verification point 406a could, for example, additionally output a value indicative of standard deviation of input received by application 312 from a light sensor. This latter test output could be used to provide insight into the relative stability of input received by application 312 from a light sensor. Significant deviation output by this alternative embodiment of verification point 406a could indicate a malfunction of or bug in application 312.

As will be appreciated, the non-binary output and multiple outputs from a single verification point can easily be extended to a test script 308 or a test suite. That is, a test script 308 may output a non-binary value, one or more outputs and the like.

As will be appreciated by those skilled in the art, modifications to the above-described embodiment can be made without departing from the essence of the invention.

While one (or more) embodiment(s) of this invention has been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto. Other modifications will be apparent to those skilled in the art and, therefore, the invention is defined in the claims.

What is claimed is:

1. A verification point for use in a test script, said verification point tangibly embodied in a tangible computer readable medium and adapted to output a non-binary value which indicates an actual result resulting from execution of a test command within the test scrip that is associated with the verification point, wherein the verification point comprises a verification rule, said verification rule generating said non-binary value from calculations performed by the verification rule on input received from at least one process; wherein said verification rule defines (i) how output from said verification point is generated, (ii) at least one input used to generate said non-binary value, and (iii) a data type, wherein said non-binary value output by said verification point is defined by said data type.

2. A method for generating a test script, said method comprising:
    creating a verification point for receiving data responsive to execution of an instruction, wherein said verification point is adapted to output a non-binary value representative of actual execution results of said instruction; and
    inserting said verification point in said test script, wherein said verification point comprises a verification rule, said verification rule generating said non-binary value from calculations performed by said verification rule on input received from at least one process, wherein said verification rule defines (i) how output from said verification point is generated, (ii) at least one input used to generate said non-binary value, and (iii) a data type, wherein said non-binary value output by said verification point is defined by said data type.

3. A computer program product containing data and instructions tangibly embodied in a tangible computer readable medium, said data and instructions when executed by a computer system adapt said computer system to:
    generate a test script for testing a computer application in whole or in part, wherein said test script comprises one or more verification points, wherein at least one of said one or more verification points is adapted to output a non-binary value which indicates an actual result resulting from execution of a test command within the test script that is associated with the at least one of said one or more verification points, wherein said test script outputs a plurality of non-boolean values, and wherein the at least one of said one or more verification points comprises a verification rule that defines (i) how output from said verification point is generated, (ii) at least one input used to generate said non-binary value, and (iii) at least one data type, wherein at least one of said plurality of non-binary values output by said verification point is defined by said at least one data type.

4. A computer program product containing data and instructions tangibly embodied in a tangible computer readable medium, said data and instructions when executed by a computer system adapt said computer system to:
    create a verification point for receiving data responsive to execution of an instruction, wherein said verification point is adapted to output a non-binary value representative of actual execution results of said instruction; and
    insert said verification point in said test script, wherein said verification point comprises a verification rule is further adapted to output a plurality of non-binary values as specified by the verification rule, said verification rule generating said non-binary value from calculations performed by said verification rule on input received from at least one process, wherein said verification rule defines (i) how output from said verification point is generated, (ii) at least one input used to generate said non-binary value, and (iii) a data type, wherein said non-binary value output by said verification point is defined by said data type.

5. A verification point for use in a test script, said verification point tangibly embodied in a tangible computer readable medium and comprising a means for output a non-binary value which indicates an actual result resulting from execution of a test command within the test scrip that is associated with the verification point, wherein the verification point further comprises a verification rule, said verification rule generating said non-binary value from calculations performed by the verification rule on input received from at least one process; wherein said verification rule defines (i) how output from said verification point is generated, (ii) at least one input used to generate said non-binary value, and (iii) a data type, wherein means for outputting said non-binary value outputs data conforming to said data type.

6. A data processing apparatus, including a processor, for generating a test script for testing a computer application in whole or in part, said data processing apparatus adapted to generate a test script, wherein said test script comprises one or more verification points, wherein at least one of said one or more verification points comprises means for outputting a non-binary value which indicates an actual result resulting from execution of a test command within the test script that is associated with the at least one of said one or more verification points, wherein the at least one of said one or more verification points comprises means for outputting a plurality of non-binary values, and wherein the at least one of said one or more verification points comprises a verification rule that defines (i) how output from said verification point is generated, (ii) at least one input used to generate said non-binary value, and (iii) at least one data type, wherein at least one of said plurality of non-binary values output by said verification point is defined by said at least one data type.

* * * * *